United States Patent [19]

Hakim

[11] E Re. 29,050

[45] Reissued Nov. 30, 1976

[54] TOY WITH SOUND PRODUCING MEANS

[76] Inventor: Louise Z. Hakim, P.O. Box 4826, Monroe, La. 71201

[22] Filed: Jan. 4, 1973

[21] Appl. No.: 320,915

Related U.S. Patent Documents

Reissue of:

[64] Patent No.: 3,702,038
Issued: Nov. 7, 1972
Appl. No.: 193,756
Filed: Oct. 29, 1971

[52] U.S. Cl. ..... 46/178
[51] Int. Cl.[2] ..... A63H 5/00
[58] Field of Search ..... 46/175, 178, 179, 180, 46/117, 118

[56] References Cited

UNITED STATES PATENTS

| | | | |
|---|---|---|---|
| 2,331,630 | 10/1943 | Rempel | 46/117 |
| 2,598,956 | 6/1952 | Wintriss | 46/117 X |
| 2,598,956 | 6/1952 | Wintriss | 46/117 |
| 2,745,214 | 5/1956 | Lawson | 46/117 |
| 2,819,558 | 1/1958 | Freimauer | 46/117 |
| 2,928,208 | 3/1960 | Wintriss | 46/117 |
| 3,032,920 | 5/1962 | Cohn | 46/117 |
| 3,075,317 | 1/1963 | Craft | 46/117 |

FOREIGN PATENTS OR APPLICATIONS

| | | | |
|---|---|---|---|
| 814,021 | 5/1959 | United Kingdom | 46/117 |

*Primary Examiner*—Richard J. Apley
*Assistant Examiner*—Marvin Siskind

[57] ABSTRACT

Toys incorporate sound producing components in such manner that the components cannot become dislodged from the toy structure. In a first embodiment, the sound producing component is a separate element but is embedded in a boss formed on the toy wall, the boss and wall including interfitting means which engage the component to securely anchor it in place. The material of fabrication of the toy fully envelopes the sound producing component.

In the second embodiment, the sound producing component is formed integrally with the toy and has a conical sound chamber with an associated bellows operated responsive to squeezing of the toy walls.

6 Claims, 6 Drawing Figures

TOY WITH SOUND PRODUCING MEANS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to safety toys for infants and young children, the toys being constructed in such manner as to diminish the likelihood of injury to the user by virtue of dislodgement of components.

2. Statement of the Prior Art

Toys of the squeeze variety have long been provided with sound producing components or "squeakers." Such devices have recently fallen under adverse scrutiny due to the possibility of these squeakers being dislodged during play. In such instance there is a possibility of the component being swallowed or otherwise causing harm to a young child.

SUMMARY OF THE INVENTION

The present invention contemplates production of squeeze toys having noise producing devices operative upon deformation of the body of the toy wherein the possibility of accidental disengagement of the devices from the toy is effectively eliminated. In achieving this objective it is the principal purpose of the invention to supply a toy as aforesaid wherein a noise emitting device is embedded in a particularly formed section of the toy, or alternatively is formed as an integral component of the toy per se. By these expedients the invention insures the safety of the children using the toys while retaining the interest level of children through the incorporation of sound producing means.

Other and further objects and advantages of the invention will become apparent to those skilled in the art from a consideration of the following specification when read in conjunction with the annexed drawing.

DESCRIPTION OF THE PREFERRED EMBODIMENTS

Figure 1:
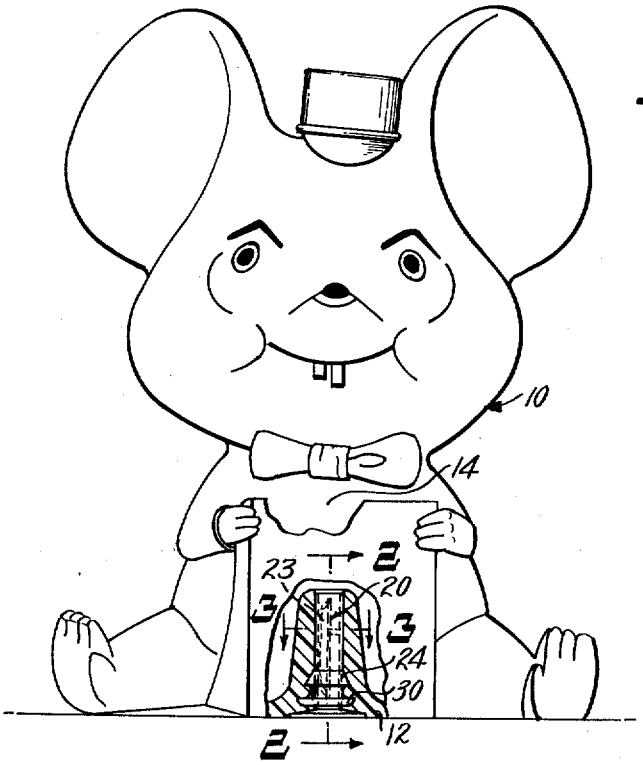
FIG. 1 is a frontal view of a toy with a portion broken away for disclosure of a sound emitting device incorporated therein in accordance with this invention.
Figure 2:
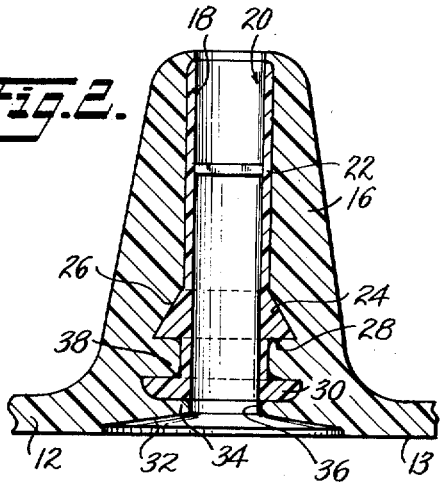
FIG. 2 is an enlarged vertical cross section taken on line 2—2 of FIG. 1, looking in the direction of the arrows.
Figure 3:
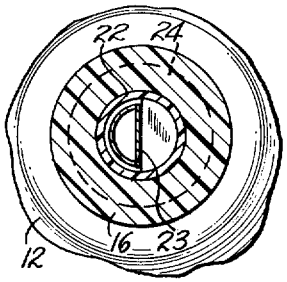
FIG. 3 is a further cross section on line 3—3 of FIG. 1, looking in the direction of the arrows.

Referring initially to FIGS. 1 through 3 of the drawing, a toy of a representative type embodying the invention is therein identified by reference numeral 10. The toy is formed of rubber, synthetic materials, plastic or similar substances having the characteristics of deformability and a plastic memory for return to original configuration after deformation. The toy 10 is substantially hollow or includes at least a deformable area or portion which is hollow. The toy includes a wall 12 (in this instance the base of the device) in proximity to the deformable area (here the central body 14 of the toy) and the wall includes an outer surface 13.

The wall 12 is formed with an enlarged inwardly extending boss 16 which is preferably integral with the body of the toy. The wall and boss have a compound opening 18 formed therein described in more detail below.

A noise emitting device 20 is mounted in the boss 16 and includes a straight section 22, having a whistle 23, an intermediate skirt 24 having a slant wall 26 and a perpendicular shoulder 28, and a bottom annular ring portion 30. The noise emitting device 20 is fully embedded in the boss 16. It will be observed in FIG. 2 that the opening 18 is substantially enlarged at the outer surface 13 of the toy wall providing a shallow, cupped inward opening 32. The wall, at the termination of the opening 32, has a flange section 34 defining an opening 36 and overlying fully the ring 30. Similarly, the boss 16 includes a central inward flange 38 which occupies the space between the shoulder 28 of the skirt member and the ring thus effectively preventing movement of the noise emitting device relative to the boss.

From the foregoing it is to be noted that the noise emitting device is fully encased and cannot be removed from the toy without destruction of the boss and wall. Operation is the same as that involved in conventional squeeze toys, that is, deformation of the toy in the area 14 or other deformable portion causes the emission of air through the noise emitting device with a consequent sound. When the body of the device is released, and returns to its original configuration, air is drawn therein through the noise emitting device.

Figure 5:
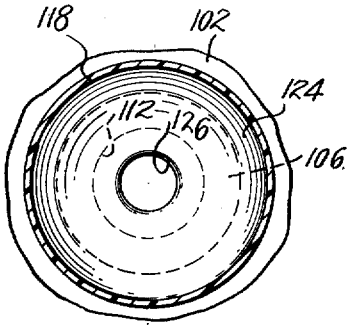
FIG. 5 is a longitudinal sectional view of the modification, taken on line 5—5 of FIG. 4.
Figure 4:
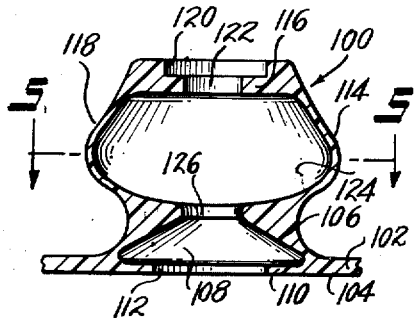
FIG. 4 is a vertical cross section of a modified form of the invention.

In FIGS. 4 and 5 a noise producing means 100 is formed integral with a toy wall 102 having an outer surface 104. In this form of the invention, the toy per se is not shown in the drawing, but it will be understood that the device projects inwardly into the body portion of a toy of the type described above.

The means 100 comprises an annular, inwardly extending cone element 106 defining a sound chamber 108 of similar configuration. The wall 104 has an annular extension 110 with a central opening 112, the extension 110 partially closing the chamber 108. The means 100 further includes a bellows or expansion section 114 having a top wall 116 and a side wall 118 of reduced thickness. The bellows top wall has a compound opening therein to the toy interior including an enlarged first section 120 and an air entry portion 122 leading to the expansion chamber 124 provided by the bellows. Air from the bellows is expelled into the sound chamber 108 through an opening 126. From the foregoing it is seen that the squeezing of the toy wall results in forcing air through the openings 120, 122 into the expansible bellows from which it is subsequently propelled into the sound chamber 108 at a slower rate. This differentiation of rate results in a squeaking sound of interest to infants and children. In this form of the invention there is no possibility of disengagement of the noise producing means without destruction of the toy inasmuch as the entire sound producing means is formed as an integral part of the toy.

Figure 6:
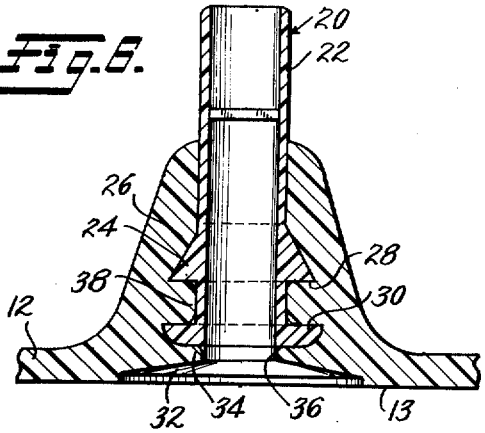
FIG. 6 is a view similar to FIG. 2, showing another modification.

In FIG. 6 of the drawings, it will be observed that the material of fabrication of the toy wall 12 extends at least over the skirt 24, but does not extend the full height of the noise emitting device 20.

I claim:

1. A squeeze toy comprising:

a body portion with a deformable area for expulsion of air therefrom upon deformation;

the toy including a wall;

the wall having an enlarged inwardly extending boss thereon;

the wall and the boss having a compound opening formed therein and extending fully therethrough;

a noise emitting device mounted in said boss and adapted to sound upon the passage of expelled air therethrough responsive to deformation of the body portion;

said wall having an outer surface;

the opening being enlarged at said outer surface;

said noise emitting device having a bottom radially enlarged annular portion;

and said wall including a flange engaged over the bottom annular portion of said noise emitting device to prevent the withdrawal of the noise emitting device through said opening.

2. The invention of claim 1, wherein;

the wall has an outer surface;

the opening being enlarged at said outer surface;

the noise emitting device having a bottom annular portion; and the wall including a flange engaged over the bottom annular portion and preventing the withdrawal of the noise emitting device through the opening.

3. The invention of claim 2, wherein:

the noise emitting device includes an intermediate skirt member; and the boss has a central flange engaged between the bottom annular portion and the intermediate skirt.

4. The invention of claim 3, wherein:

the boss is of an inward extent at least greater than the inward extent of the noise emitting device.

5. The invention of claim 3, wherein: the skirt has a slant wall in the direction of insertion.

*6. A squeeze toy comprising a resilient, hollow, one-piece integrally formed body and sounding device;*

*the body having a surrounding wall, said wall having exterior and interior surfaces;*

*at least a section of said wall being deformable;*

*said sounding device including a conically shaped sound producing chamber located inwardly of said interior surface;*

*said conical chamber having a large end and a small end;*

*a first opening means in communication with said conical chamber adjacent said small end and spaced from the exterior wall surface;*

*second opening means larger than said first opening means spaced from said first opening means, adjacent the large end of said conical chamber and said exterior wall surface, and communicating with ambient air;*

*an expansion chamber formed adjacent said conical chamber and having third opening means, said third opening means communicating with the hollow interior of the toy, said first opening means being in communication with said expansion chamber;*

*whereby squeezing the deformable toy wall section results in forcing air through the expansion chamber into the sound chamber at different rates resulting in a squeaking sound.*

* * * * *